United States Patent [19]
Hummel et al.

[11] Patent Number: 4,526,565
[45] Date of Patent: Jul. 2, 1985

[54] METHOD OF MAKING FLAT BOTTOM PLASTIC BAG

[75] Inventors: John E. Hummel; William E. Baab, both of Tulsa, Okla.

[73] Assignee: Linear Films, Inc., Tulsa, Okla.

[21] Appl. No.: 469,028

[22] Filed: Feb. 23, 1983

[51] Int. Cl.³ ............................................. B31B 35/00
[52] U.S. Cl. .................... 493/196; 493/197; 493/211; 493/463; 493/936
[58] Field of Search .............. 493/218, 936, 197, 196, 493/195, 194, 193, 248, 463, 211

[56] References Cited

U.S. PATENT DOCUMENTS

| | | | |
|---|---|---|---|
| 2,353,402 | 7/1944 | Haslacher | 93/35 |
| 2,771,010 | 11/1956 | Piazze | 93/35 |
| 3,263,902 | 9/1966 | Ludlow et al. | 229/60 |
| 3,321,354 | 5/1967 | McCutcheon Sloan et al. | 493/196 X |
| 3,403,841 | 1/1968 | Wendt et al. | 229/60 |
| 3,412,925 | 6/1968 | Booth et al. | 229/55 |
| 3,435,736 | 8/1969 | Reiche | 93/35 |
| 3,437,258 | 8/1969 | Kugler | 229/58 |
| 3,509,799 | 5/1970 | Weis et al. | 493/197 |
| 3,548,722 | 12/1970 | Jones et al. | 493/196 |
| 3,585,907 | 6/1971 | Rochla | 493/194 |
| 3,669,347 | 2/1972 | Piatz et al. | 229/58 |
| 3,738,565 | 6/1973 | Ackley et al. | 229/55 |
| 3,739,977 | 6/1973 | Shapiro et al. | 229/55 |
| 3,750,937 | 5/1973 | Goodwin | 229/66 |
| 3,970,241 | 7/1976 | Hanson | 229/58 |
| 4,041,851 | 8/1977 | Jentsch | 93/35 |
| 4,262,581 | 4/1981 | Ferrell | 493/194 X |

FOREIGN PATENT DOCUMENTS

| | | |
|---|---|---|
| 273685 | 10/1963 | Australia . |
| 2613724 | 4/1977 | Fed. Rep. of Germany . |
| 2644546 | 6/1978 | Fed. Rep. of Germany . |
| 1376037 | 9/1963 | France . |
| 1515931 | 6/1978 | United Kingdom . |

*Primary Examiner*—James F. Coan
*Attorney, Agent, or Firm*—Hubbard, Thurman, Turner & Tucker

[57] ABSTRACT

A flat bottom plastic film bag includes triangular gusset portions formed by a plurality of parallel heat welds which fuse portions of opposed pleats together and cooperate with a transverse central bottom seam to form a flat bottom bag from a seamed or seamless plastic film tube. The longitudinal side and end walls of the bag are provided with heat embossed corrugations which enhance the freestanding characteristics of the bag and a transverse crease is formed along the fold line between the sidewalls of the bag and the bottom wall to enhance the bottom forming characteristics of the bag when it is snapped from a folded position to an opened position. The bag may be made by an improved process wherein a blown film tube is continuously slit sealed into a plurality of tubes which are reinflated, then collapsed to form opposed double pleat folds, followed by corrugation of the side and end walls of the tube, formation of the transverse crease defining the fold line between the bottom and sidewalls and, finally, formation of the gusset welds, the transverse bottom seal and perforation or cutoff to form the individual bags.

11 Claims, 21 Drawing Figures

METHOD OF MAKING FLAT BOTTOM PLASTIC BAG

BACKGROUND OF THE INVENTION

1. Field of the Invention

The present invention pertains to a flat bottom plastic bag which is formed from an extruded or blown film tubular plastic sleeve and to an improved process of making such a bag on a continuous or intermittent basis.

2. Background

In the art of plastic bags there have been previous efforts to develop a bag which when opened is adapted to form a flat bottom and is substantially freestanding. Such characteristics of a bag or sack are particularly desired in the grocery industry and other applications wherein it is desired to fill the bag with several articles which preferably are kept upright and/or are stacked for more efficient utilization of the bag's capacity. A problem of longstanding with lightweight plastic bags formed of plastic film such as polyethylene or polypropylene is the effective formation of folds and webs or gussets in the bag which will provide a flat bottom which may be formed by a somewhat snap opening action such as may be accomplished with flat bottom paper bags. Prior art efforts to develop flat bottom plastic bags which can be economically manufactured on a substantially continuous basis have not been highly successful and the bags so manufactured do not have the desired opening and freestanding characteristics.

However, in accordance with the present invention several deficiencies associated with prior art plastic film type bags have been overcome in providing a bag which may be opened to form a substantially flat rectangular bottom wall and wherein the bag sidewalls are freestanding, both characteristics being highly desired in bags which are used for grocery and other mixed commodity usage.

SUMMARY OF THE INVENTION

The present invention provides an improved plastic bag particularly adapted for use as a grocery bag or the like which is preferably formed from a blown or extruded tubular plastic sleeve, may be opened into a configuration which provides a substantially rectangular flat bottom wall portion, and is substantially freestanding to facilitate filling the bag.

In accordance with one aspect of the present invention there is provided a bag formed from plastic film having an improved arrangement of creases or folds and heat seals or welds which facilitate the formation of the bag to have a substantially flat bottom when the bag is opened and to cause the bag to be substantially freestanding. It has been determined in accordance with the present invention that an improved bag formed from a tubular plastic sleeve or the like is obtainable wherein the bag is provided with a plurality of longitudinal corrugations or pleats, wherein the bag material is folded onto itself and heat sealed to form opposed generally triangular shaped webs or gussets forming a portion of the bottom wall structure of the bag in the opened condition and wherein a transverse crease is formed at a fold line between the sidewalls and the bottom wall of the bag to facilitate opening of the bag to form the flat bottom wall and to aid in maintaining the bag in an open and freestanding position.

In accordance with another aspect of the present invention there is provided a flexible bag formed of tubular plastic sheet or the like which is provided with opposed heat sealed web or gusset parts forming a portion of the bottom wall of the bag, which gussets are provided with an improved configuration of heat sealed portions or welds providing improved strength and stiffness to the bottom wall and enhancing the bag opening and bottom wall formation characteristics.

In accordance with yet another aspect of the present invention there is provided a bag which is formed from a plastic film tube which has been heat welded or sealed along opposed longitudinal edges, said tube being preferably formed as one of a plurality of tubes formed from a larger tube in a continuous blown film fabricating process. The longitudinal heat welds are of an improved configuration including a band or web and a bead formed along the edge of said band. The longitudinal bands are positioned with respect to the bag folds to add stiffness to the bag to assist in maintaining the bag freestanding when it has been opened.

The present invention further contemplates the provision of an improved manufacturing process for plastic bags wherein a blown tubular plastic film is formed, folded to provide longitudinal opposed pleats or folds, corrugated to enhance the stiffness of the bag sidewalls, creased to form a transverse fold line to enhance the bag opening characteristics, and heat sealed or welded to form opposed generally triangular gussets forming a portion of the bottom wall of the bag and finally provided with a bag bottom seal. The process of the present invention may be carried out on a continuous or intermittent basis and may include the formation of a plurality of plastic film tubes which may be processed simultaneously to fabricate bags in accordance with the present invention.

Those skilled in the art will further appreciate the abovementioned features and advantages of the present invention as well as other superior aspects thereof upon reading the detailed description which follows in conjunction with the drawings.

DESCRIPTION OF THE PREFERRED EMBODIMENTS

Figure 1:
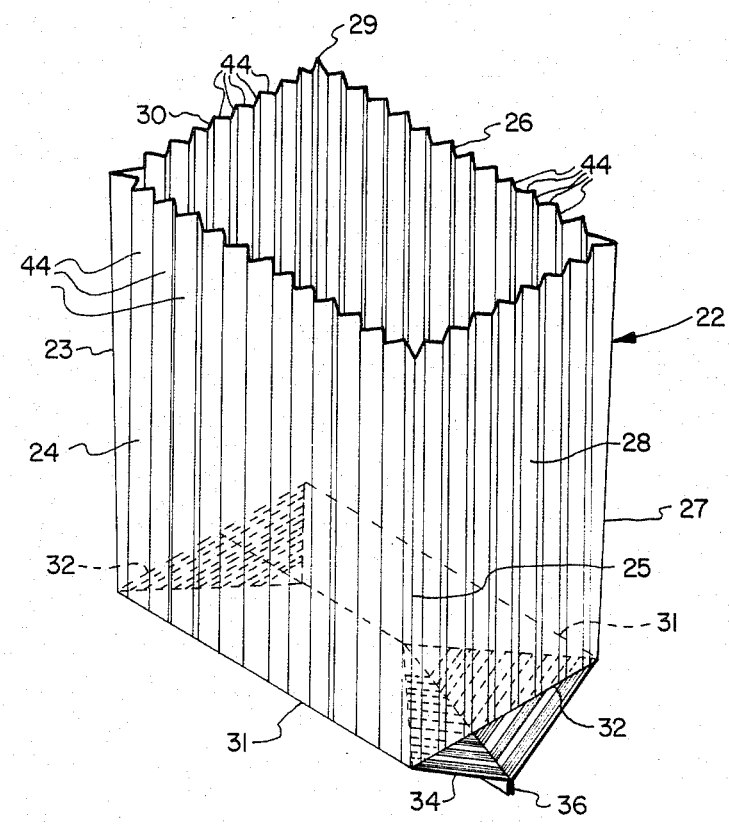
FIG. 1 is a perspective view of a plastic film flat bottom bag in accordance with the present invention.

In the description which follows like parts are marked throughout the specification and drawings with the same reference numerals, respectively. The drawings are not necessarily to scale and certain features of the invention may be exaggerated in scale or shown in schematic or diagrammatic form in the interest of clarity and conciseness.

The present invention contemplates the provision of a plastic flat bottom bag manufactured from plastic film tube or sheet selected of a thickness and of a material in accordance with the state of the art in the manufacture of plastic bags. It is believed that the bag of the present invention and the process for manufacturing the bag in accordance with the present invention may be carried out utilizing plastic film such as polyethylene, copolymer film or polypropylene film, for example, or similar materials having a thickness range of between 0.2 mils and 0.5 mils, for example. The size and shape of the bag may vary in accordance with the particular usage; however, an exemplary bag suitable for use as a grocery bag may be of generally rectangular construction having a bottom approximately 12 inches in length by 7½ inches in width and with the overall height or depth of the bag being approximately 16 inches when opened.

Figure 2:
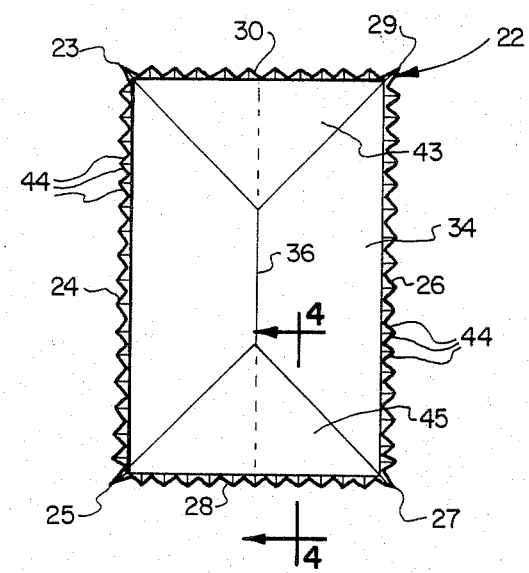
FIG. 2 is a top plan view of the bag illustrated in FIG. 1.
Figure 3:
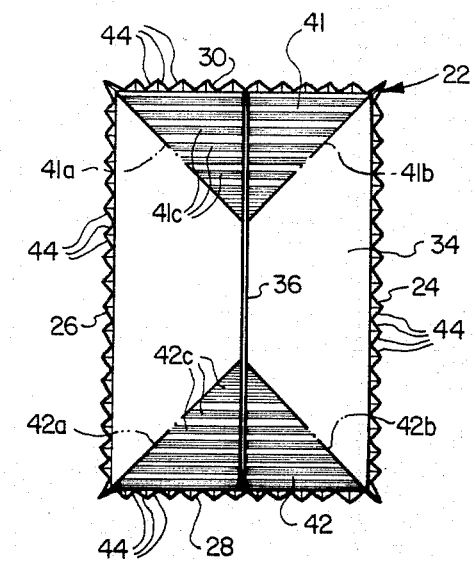
FIG. 3 is a bottom plan view of the bag illustrated in FIG. 1.

Referring now to FIGS. 1 through 3 there is illustrated one embodiment of a plastic bag in accordance with the present invention and generally designated by the numeral 22. The bag 22 is preferably formed of one of the aforementioned plastic materials which may be provided as a continuous blown seamless tube, as a seamed tube provided in accordance with one process of the present invention, or from a seamed tube according to another process. FIG. 1 illustrates the bag 22 in a substantially open position wherein the bottom wall has not been completely formed flat in the interest of illustrating a portion of one of the webs or gussets which forms part of the bottom wall. The bag 22, in the condition shown in FIG. 1, is provided with opposed sidewalls 24 and 26, and end walls 28 and 30. The sidewalls and end walls are delimited by longitudinal generally parallel fold lines 23, 25, 27 and 29, and the bottom of the bag is defined by opposed parallel fold lines 31 which are formed in the respective sidewalls 24 and 26 and opposed fold lines 32, formed in the same plane as the fold lines 31 and across the end walls 28 and 30. The bottom wall of the bag is generally designated by the numeral 34 and includes a numeral 34 and includes a transverse center seam 36 which is preferably formed by a heat sealing process as will be described in further detail herein.

Figure 5:
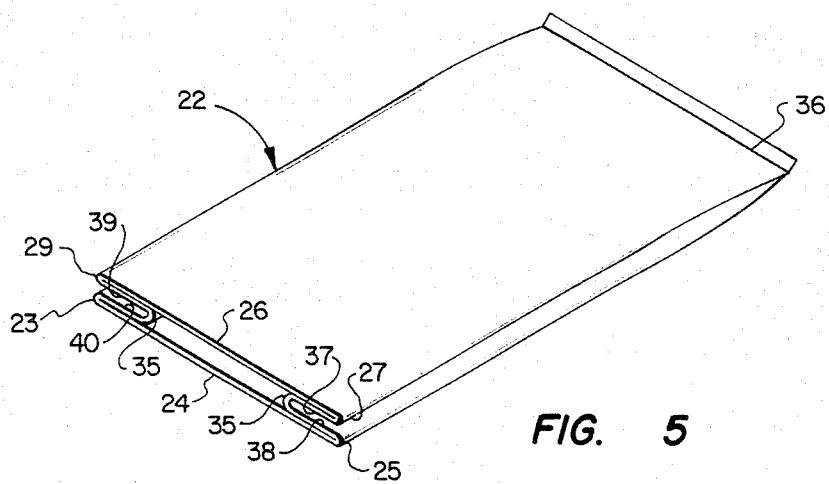
FIG. 5 is a perspective view of the bag of the present invention showing one configuration of the longitudinal folds formed from a seamless plastic film tube.

Referring briefly to FIG. 5, in accordance with one embodiment of the bag of the present invention the end walls 28 and 30 are each folded along a longitudinal central fold line 35 so that the bag may be folded substantially flat to form opposed pleats in each of the end walls, which pleats are designated by the numerals 37 and 38 for the wall 28, and 39 and 40 for the wall 30 as illustrated. In the view of FIG. 5, the longitudinal corrugations have been omitted to better illustrate the folds and pleats.

Figure 4:
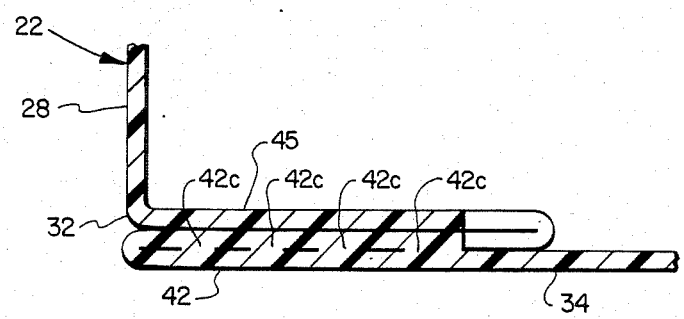
FIG. 4 is a detail section view taken along the line 4—4 of FIG. 2.

Referring now to FIGS. 2, 3 and 4, in particular, the bottom wall 34, which is formed in part by portions of the sidewalls 24 and 26 between the fold lines 31 and the seam 36, is also formed in part by a pair of opposed triangular shaped gussets or webs 41 and 42, which are created by heat sealing portions of the pleats 37 and 39 and 38 and 40 to the respective sidewalls 26 and 24 along diagonal lines extending from the longitudinal corner folds defining the sidewalls to the center seam 36. The gussets 41 and 42 may be formed by heat sealing the respective wall portions described above along respective lines 41a, 41b, 42a and 42b in accordance with an inventive method described in conjunction with FIG. 20. Alternatively, and also in accordance with the present invention, the gussets 41 and 42 may be formed by a plurality parallel heat seals or welds 41c and 42c, respectively, which extend between the respective lines 41a–41b and 42a–42b as illustrated in FIG. 3. The bottom wall 34 is also further strengthened, upon opening the bag, by the formation of second triangular gussets 43 and 45 formed between the folds 32 and the respective aforementioned lines 41a–41b and 42a–42b.

FIG. 4 is a typical section view through one portion of the gusset or web structure formed by the gusset 42 and showing the configuration of the material after the respective parallel heat welds or seals 42c are formed to essentially fuse the respective portions of the bottom wall 34 to the portions of the pleats 37 and 38 which become the gusset or web portion of the bottom wall. As will be recognized by those skilled in the art the formation of the parallel heat seals or welds 41c and 42c increases the rigidity of the respective gussets 41 and 42 and enhance the formation of the bottom wall 34 upon opening the bag from the folded condition illustrated in FIG. 5 to the substantially open condition illustrated in FIG. 1 and the further fully open condition represented in FIGS. 2, 3 and 4.

The bag 22 is further provided with improved means for causing the bag to be maintained in an open freestanding position and to be easily snapped from a flat folded configuration illustrated in FIG. 5, for example, to a substantially open condition as illustrated in FIGS. 1 through 4, said improved means comprising a plurality of longitudinally extending pleats or corrugations, generally designated by the numeral 44. The corrugations 44 may be formed by pressing the sidewalls 24 and 26, when the bag is in the folded condition illustrated in FIG. 5, between suitable pressing die rollers or plates. Such pressing dies are provided with longitudinal serrations and wherein the pressing force is sufficient or is performed in combination with elevating the temperature of the rollers or plates sufficiently to cause a permanence of the corrugations. The formation of the corrugations 44 will be described in further detail herein in conjunction with an improved process for manufacturing the bag of the present invention.

Figure 6:
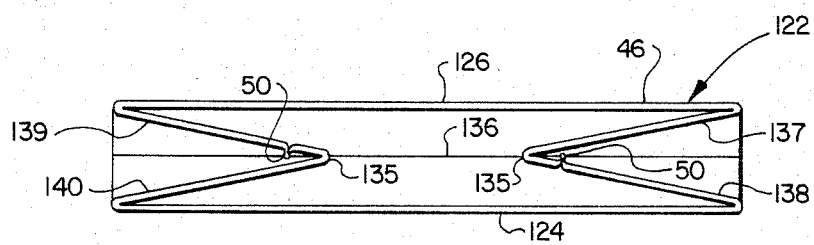
FIG. 6 is a transverse end view of an alternate embodiment of a bag formed from a tube having opposed longitudinal seams and illustrating one arrangement of folding the bag.
Figure 6A:
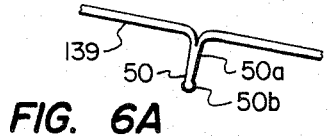
FIG. 6A is a detail end view of one of the longitudinal seams of the bag tube shown in FIG. 6.

Additional means for strengthening the sidewalls of the bag 22 to enhance the ability of the bag 22 to assume a freestanding open position is provided by forming the bag from a seamed tube as illustrated in FIG. 6. FIG. 6 is an end view of an alternate embodiment of a bag which has been partially opened to show the bag interior space. Referring to FIG. 6, there is illustrated a seamed plastic tube generally designated by the numeral 46 which may be formed into a bag 122 similar to the bag 22 having opposed sidewalls 124 and 126 and end walls formed by opposed pleats 137, 138, 139 and 140. The plastic film tube 46 has opposed longitudinal seams 50 formed by heat sealing or welding the longitudinal edges of two opposed plastic sheets or panels. Alternatively, and in accordance with the present invention, the tube 46 may be formed by cutting a relatively wide seamless tube into a plurality of opposed longitudinal sheets which are sealed together along the seams 50. Looking at the detail view of FIG. 6A, by way of example, the seam 50 may be formed by opposed heated press rollers and a hot wire knife, for example, to provide a band or web seal 50a of predetermined width and a seal bead or flange 50b to assure that the bag is airtight. Moreover, the formation of the band 50a and the bead 50b provides a relatively still member which resists bending or deflections perpendicular to its longitudinal axis, and particularly in a plane parallel to the plane of the band 50a.

Figure 7:
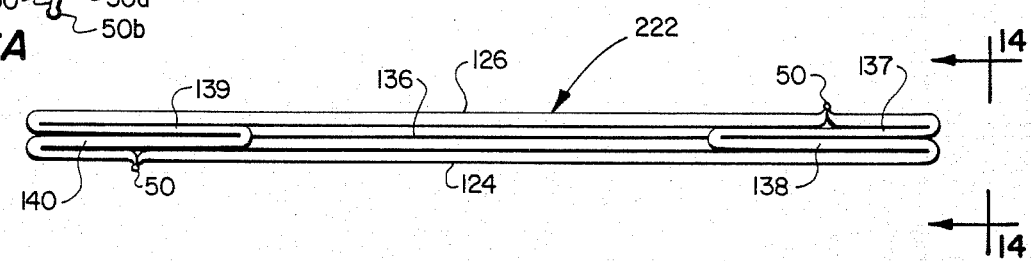
FIG. 7 is a view similar to FIG. 6 showing another arrangement of longitudinal folds in a bag having opposed longitudinal seams.

The opposed seams 50 are preferably formed to one side of each of opposed folds 135 to facilitate formation of the fold as will be described in accordance with the improved bag making process of the present invention. The longitudinal seams 50 may, in fact, be formed at a selected one of several desired positions on the periphery of the tube 46 as indicated by an alternate position of the seams 50 for a bag 222 illustrated in FIG. 7. Depending on the position of formation of the folds which create the pleats 137, 138, 139 and 140, the seams 50 may be located along the sidewalls 124 and 126, at any of the corner folds forming the pleats 137, 138, 139 and 140 or anywhere along the lateral extent of the pleats themselves as indicated by the embodiment of FIG. 6. However, it has been determined that it is preferable to form the seams 50 along the sidewalls of the bag so that the seams will not impair the formation of the transverse folds along the lower edges of the end walls which create the the gusset portions of the bottom wall.

The objective of providing a foldable plastic film bag which is of a substantially rectangular flat bottom configuration when opened and which may be easily pulled or snapped to an open position has been surprisingly enhanced by the overall combination of structural features of the bag described in conjunction with FIGS. 1 through 4 having, among other things, the improved gusset forming heat seals or welds 41c and 42c, and the longitudinal corrugations 44. Moreover, if the bag is made of a longitudinally slit tube or separate sheets of plastic sealed along parallel seams, such as the seams 50 described in conjunction with FIGS. 6, 6A and 7, a somewhat synergistic effect is created by these features in conjunction with the improved gusset welds and the corrugations to provide a bag which is strong, easy to open to form a flat bottom and is substantially freestanding to enhance filling the bag.

Figure 8:
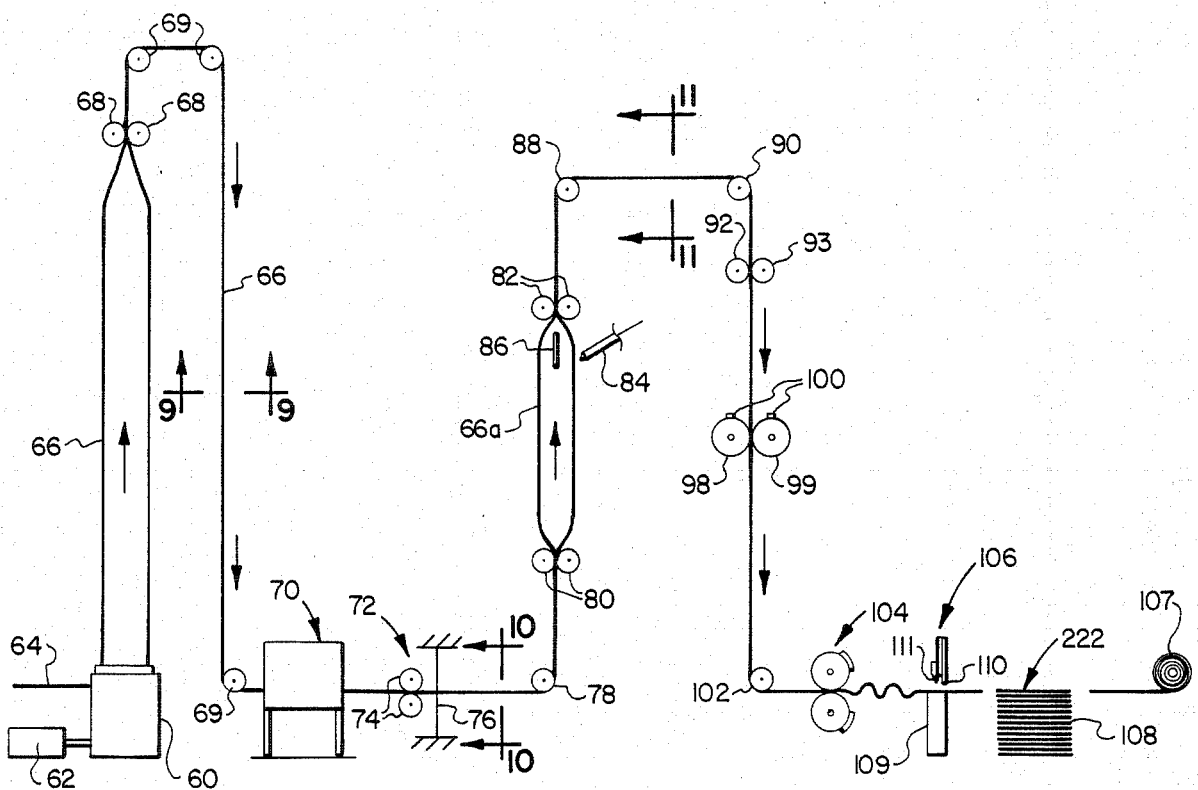
FIG. 8 is a schematic diagram of a process in accordance with the present invention of continuously forming bags from blown plastic film tube.
Figure 9:
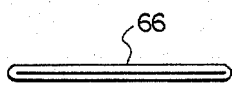
FIGS. 9, 10 and 11 are transverse section views in somewhat schematic form showing the configuration of the plastic film tube at various stages in the process illustrated in FIG. 8.

Referring now to FIG. 8, there is illustrated a schematic diagram of a system for performing an improved process for manufacturing a bag in accordance with the present invention such as the bags 22, 122 or 222. One preferred method of manufacturing a bag in accordance with the present invention includes the formation of a plastic film tube by the blown film process utilizing a blowing die, generally designated by the numeral 60 and of a type commercially available, an extruder 62 for supplying plastic material to the die and a source of pressure air including a conduit 64 in communication with the die for forming a continuous seamless plastic film tube 66. The tube 66 is collapsed by a pair of opposed pinch rollers 68 after the melted plastic is cooled and solidified to form the tube 66. After passing through the rollers 68 the tube 66 assumes the configuration shown in FIG. 9 and is then passed over suitable idler rollers 69. The process of the present invention contemplates that the tube 66 may be passed through a printing station 70 whereby suitable indicia may be printed on the portions of the collapsed planar surfaces of the tube which will eventually be formed into the sidewalls 124 and 126 of a bag 122, for example.

The process of the present invention may be adapted to form a series of bags formed end-to-end and connected to each other to be subsequently rolled onto a continuous roll of bags, or the process of the invention may be adapted to form individual bags separated from each other but suitably stacked side-by-side. If a bag 22 is to be formed utilizing the full width of the collapsed tube 66, the arrangement of pinch rollers 68 would include opposed pleat forming guides, not shown, similar to those described in conjunction with FIG. 16, for example, and disposed between the pinch rollers 68 and the die 60 to form the folds 35 so that as the tube passed through the pinch rollers 68 the basis cross-sectional configuration of the tube 66 would become that illustrated in conjunction with the bag 22 as shown in FIG. 5.

The next step in forming such a bag after a printing operation, if used, would be that of passing the tube 66 through means which would form the corrugations 44 either by opposed plate type dies or roller dies of a type to be described herein, for example. The step following the corrugation formation would be that of defining the crease coinciding with the folds 31 and 32. Preferably, the crease forming step would be followed by formation of the heat seals or welds 41a, 41b, 42a and 42b as well as, or alternatively, the formation of the welds 41c and 42c previously described. Finally, the process would involve the formation of the bag bottom seam 36 and cutting of the tube 66 adjacent to the seam 36 which forms the bottom of one bag and the opening or top of the adjacent bag.

Figure 10:
Figure 15:
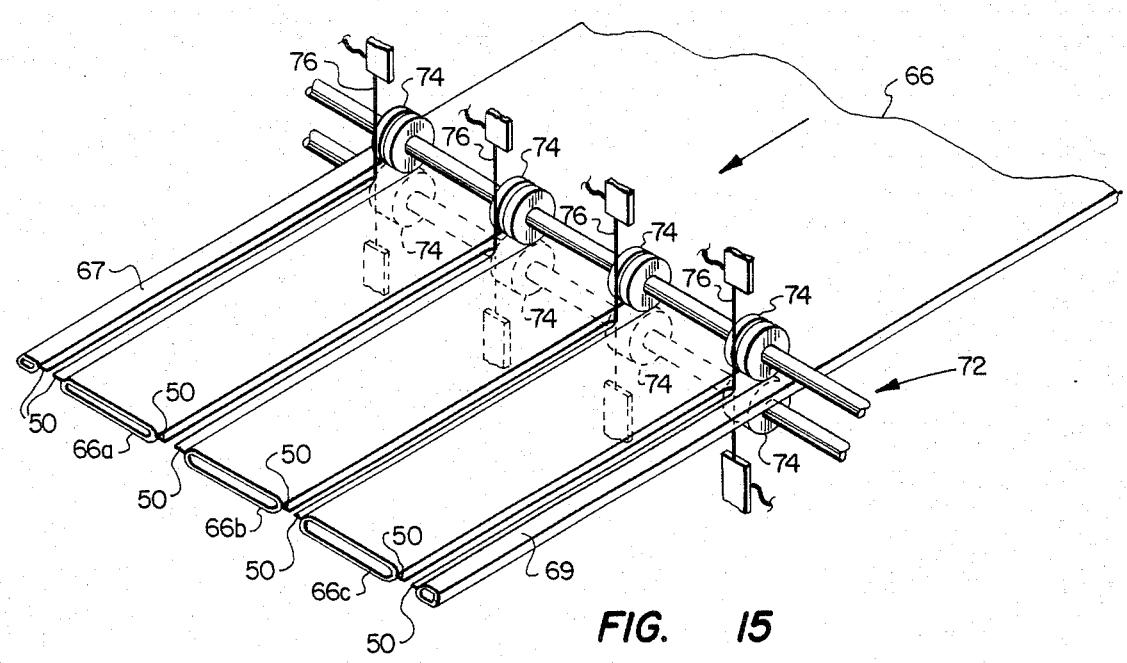
FIG. 15 is a perspective view in somewhat schematic form of an arrangement for forming three separate continuous plastic film tubes from a single blown film tube in accordance with the bag manufacturing process of the present invention.

The bag manufacturing process of the present invention contemplates a significant increase in the productivity of the above mentioned basic process as will be described further referring to FIG. 8. As shown in FIGS. 8 and 15, after passing the printing station 70, if required, the tube 66 passes through a station 72 at which the seamless tube is formed into a plurality of separate seamed tubes 66a, 66b and 66c as indicated also schematically in FIG. 10. The tube forming station 72 is characterized by an arrangement of spaced apart seam forming knurled rollers 74 which are formed in opposed pairs, as indicated in FIG. 15, and are adapted to form longitudinal band seals such as the seal portions 50a of the bag 122. The rollers 74 are preferably heated to provide for fusing the opposing bands of plastic film to each other. As the tube 66 passes between the opposed sets of rollers 74 it encounters a plurality of spaced apart hot wire knives 76 which slit the tube 66 into plural seamed tubes 66a, 66b and 66c, as illustrated. As the material of the tube 66 is parted by the knives 76 a bead is formed along adjacent edges of each of the tubes and which comprises the seal bead 50b as previously described and shown in FIG. 6A. Accordingly, upon passing through the station 72 a plurality of continuous film tubes are formed which have opposed sealed seams 50. The opposed edges 67 and 69 of the tube 66 may be trained away to suitable waste receiving means as the tube passes through the rollers 74.

After passing the station 72 each of the plural tubes 66a, 66b and 66c pass over an idler roller 78, FIG. 8, between pinch rollers 80 and are reinflated by a standing column of air which is trapped between the sets of pinch rollers 80 and a set of pinch rollers 82 disposed spaced from the rollers 80 in the direction of travel of the film tubes. The inflation of the tubes 66a, 66b and 66c may be initially created on start up of the process and system illustrated in FIG. 3 utilizing a source of pressure air, not shown, in communication with a nozzle 84 which is inserted through a suitable puncture in each of the tubes to inflate the tubes, as indicated schematically in FIG. 8, whereupon the nozzle is then withdrawn and the tubes resealed prior to start up of the driving of the tubes. Selected ones of the aforementioned sets of rollers as well as additional sets of rollers described in conjunction with the system and process illustrated in FIG. 8 may be power rollers and/or power rollers, not shown, may be added as required for driving the tubes 66, 66a, 66b and 66c through the system.

Figure 12:
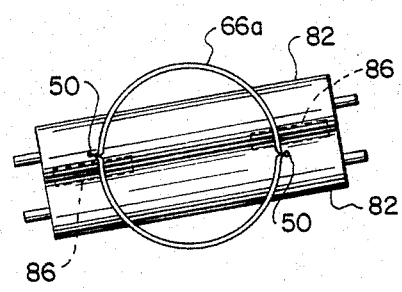
FIGS. 12 and 13 are transverse views in somewhat schematic form illustrating the orientation of the pinch rollers for various arrangements of positioning longitudinal seams of the bags.
Figure 13:
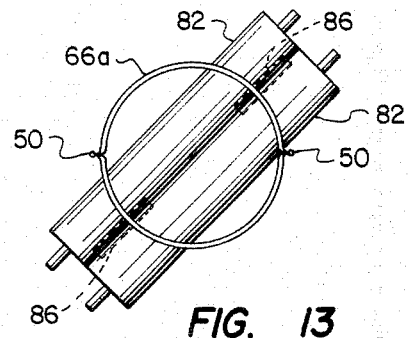
Figure 16:
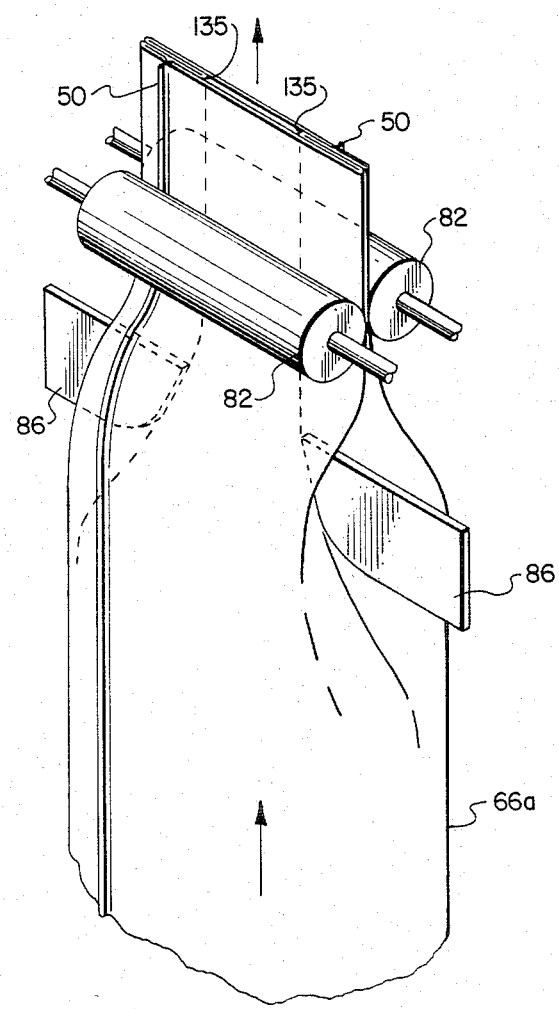
FIG. 16 is a detail perspective view in somewhat schematic form showing the formation of the longitudinal pleat folds for one of the bag tubes.

As the tubes 66a, 66b and 66c approach the pinch rollers 82 they are confronted with opposed pleat forming guides 86, as indicated schematically in FIG. 8 and, by way of example, for the tube 66a in FIG. 16. The tubes 66b and 66c are passed through similar sets of rollers 82 mounted adjacent to the roller set used for tube 66a and disposed downstream of respective sets of pleat forming guides 86. In regard to the further discussion herein in conjunction with FIGS. 8, 12, 13 and 16 through 20 it will be understood that the apparatus described and illustrated is repeated for each of the tubes 66a, 66b and 66c or however many separate tubes are being processed to form finished bags 22, 122 or 222. The guides 86 force the formation of opposed folds such as the folds 135, shown in FIGS. 6 and 7, which cause formation of the opposed pleats 137, 138, 139 and 140. However, due to the formation of the seams 50 the folds 135 are preferably formed to one side of the seams as indicated in FIG. 6 and in this respect the rollers 82 may be oriented slightly skewed with respect to a plane passing through both of the oppose seams 50 for a tube such as the tube 66a indicated schematically in FIG. 12. Moreover, in order to form the seams 50 oriented as in FIG. 7, the skewing of the rollers 82 with respect to a plane through both seams 50 would be increased, accordingly, as indicated schematically in FIG. 13, for example. The pleat forming guides 86, would, of course, remain in a plane passing between the opposed rollers 82 so that the formation of the opposed pleats would be in the desired plane.

Figure 11:
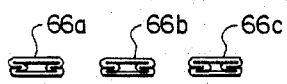
Figure 17:
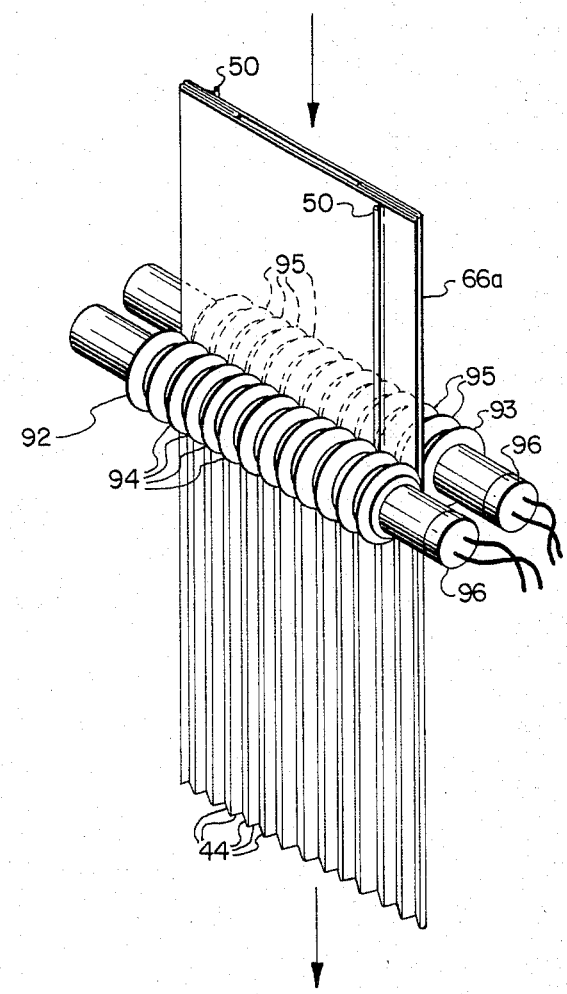
FIG. 17 is a detail view illustrating one configuration of the corrugation forming rollers for the bag of the present invention.

After passing the pleat forming station defined by the spaced apart sets of rollers 80 and 82, the three separate tubes 66a, 66b and 66c have the configuration indicated in FIG. 11 as they pass between spaced apart idler rollers 88 and 90. The three separate bag tubes then pass through a station indicated by opposed rollers 92 which are adapted to form the longitudinal bag corrugations 44. Referring briefly to FIG. 17, there is illustrated in somewhat schematic form an arrangement of intermeshed embossing rollers 92 and 93 which are suitably mounted opposed to each other and are formed to have circumferential serrations 94 and 95 which intermesh to provide the corrugations 44 as the respective tubes 66a, 66b and 66c pass between the rollers. Again, in the interest of conciseness, only one set of rollers 92-93 is shown operating on the exemplary tube 66a. The rollers 92 and 93 preferably include suitable heating elements 96 such as an electrical resistance type heating element to controllably heat the embossing surfaces of the rollers to suitably permanently corrugate the opposed sides of the bag tubes. The rotational speed of the rollers 92-93 and the surface temperature of same is controlled to prevent fusing of the tubes. The rollers 92 and 93 are suitably mounted on support bearings and framing, not shown, and may be connected to a source of electricity through conventional slip ring assemblies, for example, also not shown.

After passing between the corrugation rollers 92 and 93 it is preferable that a transverse crease be formed to define the fold line for the folds between the sidewalls and bottom wall such as the folds 31 of the bag 22, for example. The formation of a crease associated with a fold 31 promotes the formation of the fold upon opening the bag and in this respect also creases or interrupts the seams 50 and the corrugations 44. Moreover, the formation of the aforementioned crease also counteracts the tendency of the corrugations 44 to inhibit the formation of the bottom wall of the bag which is delimited by the opposed folds 31 and 32. Without the crease forming step the bag opening process might be more difficult as far as defining easily the formation of the bag bottom wall.

Referring to FIG. 8 the crease forming rollers for the tubes 66a, 66b and 66c are illustrated and generally designated by the numerals 98 and 99. The rollers 98 and 99 are provided with elongated heated crease forming ridges 100 which, when brought into registration with the surfaces of the tubes 66a, 66b and 66c will form opposed creases 101, FIG. 14, which substantially cancel or obliterate the corrugations 44 and flatten the beads 50b to provide a fold line for formation of the folds 31 and 32. Alternatively, the crease rollers 98 and 99 could be replaced by opposed crease forming blades or dies which would move perpendicular to the direction of travel of the bag tubes intermittently and in opposition to each other to form the creases illustrated in FIG. 14.

Figure 14:
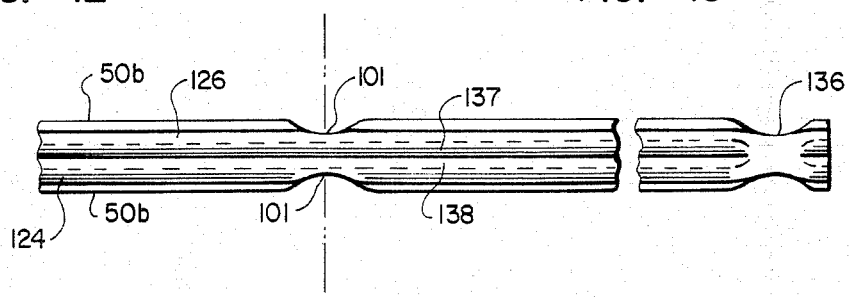
FIG. 14 is a fragmentary side elevation view taken from line 14—14 of FIG. 7.

The side elevation view of FIG. 14 also shows the heat welded transverse bottom seam 136 which is formed in a manner similar to the formation of crease 101 but with greater force and/or more intense applications of heat to fuse the opposed sidewalls together. The rollers 98 and 99 may be of a predetermined diameter to operate in timed relationship so that the placement of the aforementioned crease will be in a predetermined location on each individual bag formed from the respective bag tubes. Alternatively, the rollers 98 and 99 may be mounted on suitable apparatus to move them into position to rotate their crease forming ridges 100 into registration with each other at a predetermined time as the bag tubes pass between the rollers. The rollers 98 and 99 may be continuous across the width of the travel path of the bag tubes, or individual sets of rollers may be provided for each of the tubes 66a, 66b and 66c.

Subsequent to formation of the creases 101 associated with the folds 31 and 32 the bag tubes pass over idler rollers 102 prior to reaching a station 104 at which the heat formed seals or welds 41a, 41b and/or 41c are formed as well as the corresponding welds on the opposite sides of the tubes and corresponding to the seams or welds referenced by the numerals 42a, 42b and 42c in FIG. 3. The apparatus associated with the gusset forming station 104 may provide for a continuous weld forming process or an intermittent process which could momentarily interrupt the traversal of the tubes 66a, 66b and 66c through the system illustrated in FIG. 8. In either case, the bag tubes progress from the station 104 to a station 106 at which the bag bottom seal 36 is formed and the bag is either cut entirely transversely adjacent to the seal to form the bottom of one bag and top of the next bag or the tubes are merely perforated so that the bags may be further separated in a conventional manner such as, for example, if they are wound on a continuous roll 107 indicated schematically in FIG. 8. If the bags are cut through they may then be stacked by suitable apparatus, not shown, to form a bag stack 108 also indicated schematically in FIG. 8. The bag sealing and cutting station 106 includes a suitable anvil 109 disposed on one side of the tubes and a movable heat seal forming die 110 and a cutoff or perforating blade 111. The die 110 and blade 111 are adapted to move toward the anvil 109 and perpendicular to the direction of travel of the bag tubes.

Figure 18:
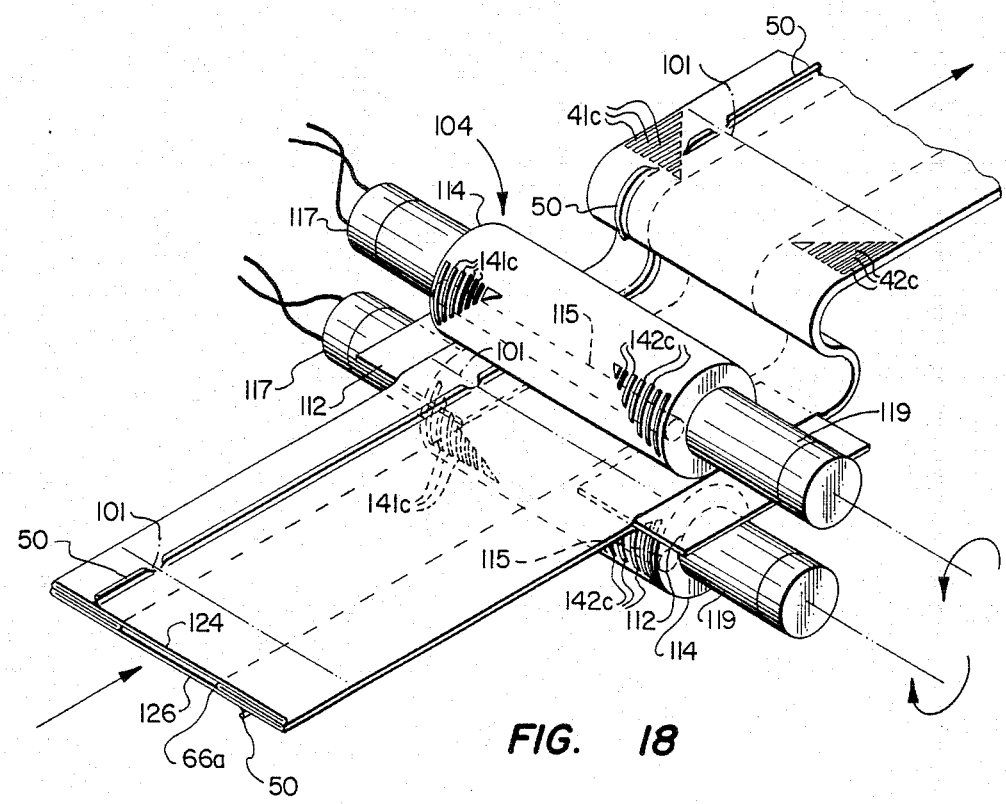
FIG. 18 is a detail perspective view in somewhat schematic form showing one arrangement for forming the heat welds in the web or gusset portion of the bag of the present invention.

Referring now to FIG. 18, the gusset forming station 104 is indicated in operation on successive bags to be formed from the tube 66a, for example. In order to simplify the drawing figure, the corrugations 44 have been omitted; however, the spaced apart creases 101 are indicated by dashed lines as shown. The gusset forming station 104 is adapted to include a pair of opposed relatively thin bladelike anvils 112 which may be inserted in the folds forming the pleats 137, 138, 139 and 140 on opposite sides of the tube 66a. The anvils 112 may be stationary and are disposed between cylindrical weld forming dies 114 illustrated in FIG. 18 disposed on opposite sides of the tube 66a. The dies 114 include spaced apart weld forming ridges 141c and 142c as illustrated. The cylindrical dies 114 are adapted to be provided with electrical resistance type heating elements 115 which are suitably connected to electrical conductors connected to a source of electric power through slip ring assemblies 117. The slip rings 117 and the dies 114 are disposed on shafts 119 suitably mounted in bearings on framing for the system of FIG. 8, not shown. The cylindrical weld forming dies 114 are driven in timed relationship to each other to rotate the opposed sets of ridges 141c and 142c into registration with opposed ones of the edges of the sidewalls 124 and 126 to weld portions of the sidewalls to the respective pleats 137, 138, 139 and 140 as the tube 66a passes through the station 104.

Figure 19:
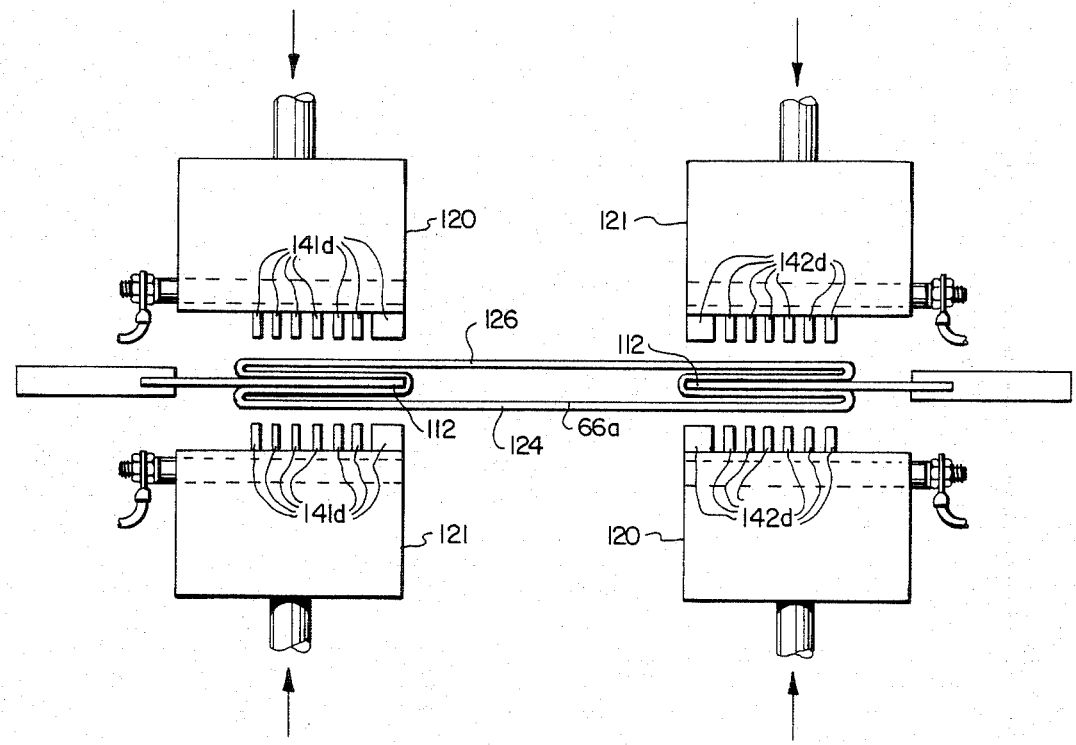
FIG. 19 is a transverse side elevation showing an alternate configuration of dies for forming the gusset welds of the bag of the present invention.

Alternatively, the weld forming dies could be configured as intermittently reciprocating members 120 and 121 having elongated flat weld forming ridges 141d and 142d formed thereon as shown by way of example in FIG. 19. Accordingly, as the tube 66a, for example, passes through station 104, the gusset welds 41c and 42c are formed.

Figure 20:
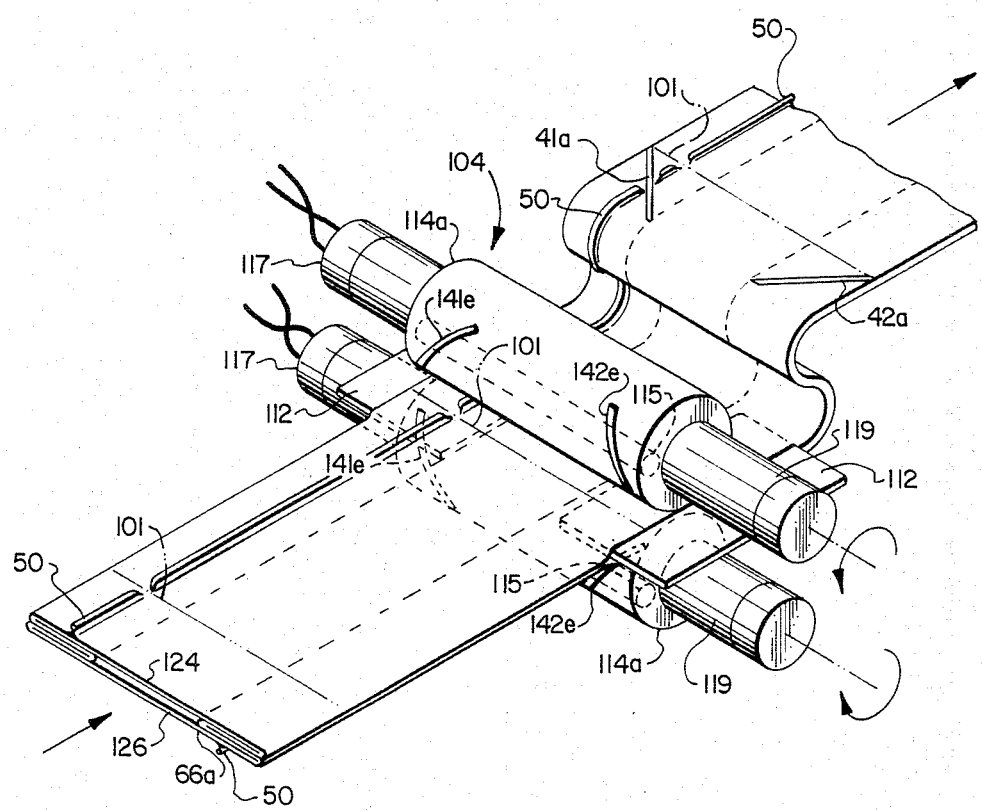
FIG. 20 is a detail perspective view similar to FIG. 18 showing another arrangement for forming heat welds in the gusset portion of the bag.

Referring to FIG. 20 there is illustrated an alternate arrangement of the gusset forming station 104 in operation on successive bags to be formed from the tube 66a, for example. As with the diagram of FIG. 18 the corrugations 44 have been omitted but the spaced apart transverse creases 101 are indicated by the dashed lines shown in FIG. 20. In FIG. 20 the heat seal or weld forming dies 114a, disposed on opposite sides of the tube 66a, include spaced apart helical weld forming ridges 141e and 142e. The dies 114a are also adapted to be provided with heating elements 115 connected to a source of electrical power through slip rings assemblies 117. The slip rings 117 and the dies 114a are also disposed on shafts 119 suitably mounted in bearings in the same manner as the arrangement described in conjunction with FIG. 18. The weld forming dies 114a are also driven in timed relationship to each other to rotate the opposed sets of ridges 141e and 142e into registration with the sidewalls 124 and 126 to form the heat seals or welds 41a and 42a, as shown, and opposing welds 41b and 42b.

As the tube 66a passes from the station 104 to the station 106, as indicated schematically in FIG. 8, the transverse seal forming bar 110 operates to form the bottom seal of the bag and the cutoff or perforating blade 111 also operates to sever the tube 66a transversely to form a bag. Since the operation of the seal forming die 110 and the cutoff or perforating blade 111 is intermittent the tube 66a may become slack between the stations 104 and 106 and further power rollers, not shown, may be provided downstream of station 106 in the direction of travel of the bag tubes through the system of FIG. 8.

As previously mentioned it will be understood that the aforedescribed operations of the components associated with stations 104 and 106 are carried out with counterpart apparatus for the bag tubes 66b and 66c simultaneously with the operation of these components on the tube 66a. Accordingly, with the system illustrated in FIG. 8, for example, a total of three bags may be formed simultaneously and on a substantially continuous basis. Those skilled in the art will recognize that, of course, depending on the width of the apparatus and the width of the tube 66, the tube forming station 72 may be arranged to form only two seamed tubes or more than three seamed tubes, the various stations downstream of the station 72 being merely required to be modified to accommodate the numbers of tubes formed at said station. Furthermore, those skilled in the art will also recognize that the steps of the process carried out by the system illustrated in FIG. 8 may be conducted in other ways to produce a bag in accordance with the present invention. However, the system of FIG. 8 is believed to be particularly advantageous for a high volume production arrangement for producing bags such as the bags 22, 122 or 222 illustrated and described herein.

Those skilled in the art will also appreciate that various substitutions may be made to the embodiments of a flat bottom plastic film bag in accordance with the present invention as well as the system and method for manufacturing such a bag as described herein without departing from the scope and spirit of the invention as recited in the appended claims.

What I claim is:

1. A method of forming a plurality of flat bottom bags from a continuously formed tube of plastic film, said bags being formed such that when opened have opposed longitudinal sidewalls and end walls and a generally rectangular integral bottom wall, said method comprising the steps of:

forming a continuous plastic film tube;

collapsing said tube to a substantially flat band having opposed sidewalls;

passing said tube through means for forming at least one continuous longitudinal band seal;

slitting said tube along said at least one band seal to form at least two continuous tubes each having at least one longitudinal heat sealed seam;

passing said tubes through pleat forming guides wherein said tubes each are folded along opposed longitudinal fold lines to form pairs of opposed longitudinal inwardly folded pleats between said sidewalls;

providing a pair of opposed dies associated with each pair of pleats of a tube and an anvil plate insertable between opposed ones of said pleats of each pair of pleats on each of said tubes;

passing said tubes between said dies while inserting an anvil plate between opposed ones of said pleats of each pair of pleats on each of said tubes and between said dies, and causing said dies to be pressed against said anvil plates to heat seal a portion of each of said sidewalls to said pleats, respectively, along respective diagonal lines extending toward respective ones of said longitudinal fold lines;

heat sealing said sidewalls of each of said tubes along a transverse line at the convergence of respective pairs of diagonal lines with said longitudinal fold lines to form a center seam of said bottom wall and to form opposed triangular gussets of said bottom wall; and cutting said tubes adjacent said center seam to define the bottom end of one bag and the top end of another bag formed of each of said tubes.

2. The method set forth in claim 1 wherein:

said seal forming means includes means for forming at least four spaced apart parallel longitudinal band seals and means for slitting said tube along respective ones of said band seals to form three separate tubes, each of said three separate tubes having opposed longitudinal seams formed by said seal forming means.

3. The method set forth in claim 1 wherein:

said tubes are collapsed with said one seam extending along one of said pleats.

4. The method set forth in claim 1 wherein:

said tubes are collapsed with said one seam extending along one of said sidewalls.

5. The method set forth in claim 1 including the step of:

providing pressing means engageable with said continuous tubes to form longitudinal corrugations in said sidewalls, and moving said tubes relative to said pressing means while engaging said tubes with said pressing means to form said corrugations to increase the freestanding capability of said sidewalls upon opening said bags.

6. The method set forth in claim 5 including the step of:

pressing said tubes to form a transverse crease defining a transverse fold line in each of said tubes after forming said corrugations in each of said tubes.

7. The method set forth in claim 1 wherein:

said dies are reciprocated toward and away from said tubes to heat seal said sidewalls to said pleats along said diagonal lines.

8. The method set forth in claim 1 wherein:

said dies are rotated relative to said tubes to heat seal said sidewalls to said pleats along said diagonal lines.

9. The method set forth in claim 1 including the step of:

forming with said dies a plurality of heat seal bands between said pleats and said sidewalls, said heat seal bands extending generally parallel to said longitudinal seam between said diagonal lines and said center seam of said bottom wall.

10. A method of forming a plurality of flat bottom bags from a tube of plastic film, said bags being formed such that when opened have opposed longitudinal sidewalls and end walls and a generally rectangular integral bottom wall, said method comprising the steps of:

forming a plastic film tube;

collapsing said tube to a substantially flat band having opposed sidewalls;

passing said tube through pleat forming means wherein said tube is folded along opposed longitudinal fold lines to form pairs of opposed longitudinal inwardly folded pleats between said sidewalls;

providing a pair of opposed dies associated with each pair of pleats of said tube and anvil means insertable between opposed ones of said pleats of each pair of pleats;

passing said tube between said dies and positioning said anvil means between opposed ones of said pleats of each pair of pleats and between said dies, and causing said dies to heat seal a portion of each of said sidewalls to said pleats, respectively, along respective diagonal lines extending toward respective ones of said longitudinal fold lines; and heat sealing said sidewalls of said tube to each other along a transverse line near the intersection of respective pairs of said diagonal lines with said longitudinal fold lines, respectively, to form a center seam of said bottom wall and to form opposed triangular gussets of said bottom wall.

11. A method of forming a plurality of flat bottom bags from a continuously formed tube of plastic film, said bags being formed such that when opened have opposed longitudinal sidewalls and end walls and a generally rectangular integral bottom wall, said method comprising the steps of:

forming a continuous plastic tube;

passing said tube between opposed pleat forming guides wherein said tube is formed with opposed longitudinal inwardly folded pleats between opposed sidewalls formed in said tube;

pressing said tube to form longitudinally extending corrugations in said sidewalls;

pressing said tube after forming said corrugations to form a transverse crease at spaced apart intervals on said tube to define transverse fold lines between said sidewalls and said bottom wall of respective ones of said bags;

forming a diagonal heat seal portion between each of said sidewalls and an adjacent pleat, respectively, said diagonal heat seal portion extending from said transverse crease toward a bottom wall center seam to form a triangular shaped gusset extending between said transverse fold lines and across said bottom wall;

heat sealing said sidewalls along a transverse line to form said center seam; and cutting said tube adjacent said center seam to define the bottom end of one bag and the top end of another bag formed of said tube.

* * * * *

UNITED STATES PATENT AND TRADEMARK OFFICE
CERTIFICATE OF CORRECTION

PATENT NO: B1 4,526,565
DATED : February 14, 1989
INVENTOR(S) : Hummel et al.

It is certified that error appears in the above-identified patent and that said Letters Patent is hereby corrected as shown below:

Face page, following "Assignee:", please change "HMW Products, South Tulsa, Okla." to -- Linear Films, Inc., Tulsa, OK. --.

Face page, under "Primary Examiner - James F. Coan", please add -- Attorneys: Robert Hardy Falk, E. Mickey Hubbard, Harry J. Watson, Hubbard, Thurman, Turner & Tucker, In the Specification, in the first column, first paragraph, third line from the bottom, please change "tranverse" to -- transverse In the Specification, in column 2, line 21, please change "detail" to -- detailed --.

Signed and Sealed this

Twenty-seventh Day of February, 1990

Attest:

JEFFREY M. SAMUELS

Attesting Officer

Acting Commissioner of Patents and Trademarks

REEXAMINATION CERTIFICATE (1012th)
United States Patent [19]
[11] B1 4,526,565

Hummel et al.

[45] Certificate Issued  Feb. 14, 1989

[54] METHOD OF MAKING FLAT BOTTOM PLASTIC BAG

[75] Inventors: John E. Hummel; William E. Baab, both of Tulsa, Okla.

[73] Assignee: HWM Products Inc., South Tulsa, Okla.

Reexamination Request:
No. 90/001,394, Dec. 4, 1987

Reexamination Certificate for:
Patent No.: 4,526,565
Issued: Jul. 2, 1985
Appl. No.: 469,028
Filed: Feb. 23, 1983

[51] Int. Cl.⁴ .............................................. B31B 35/00
[52] U.S. Cl. ................................. 493/196; 493/197; 493/211; 493/463; 493/936
[58] Field of Search ............................ 493/193–197, 493/211, 218, 248, 463, 936

[56] References Cited

U.S. PATENT DOCUMENTS

| Number | Date | Name | Class |
|---|---|---|---|
| 2,353,402 | 7/1944 | Haslacher | 93/35 |
| 2,381,850 | 8/1945 | Williams | 93/35 |
| 2,538,920 | 1/1951 | Shumann | 229/53 |
| 2,749,020 | 6/1956 | Baxter | 229/53 |
| 2,771,010 | 11/1956 | Piazze | 93/35 |
| 2,886,085 | 5/1959 | Sanger | 150/1.6 |
| 2,948,999 | 8/1960 | Schlayer et al. | 53/29 |
| 3,023,679 | 3/1962 | Piazze | 93/8 |
| 3,136,475 | 6/1964 | Geimer | 229/57 |
| 3,143,277 | 8/1964 | LaFleur | 229/57 |
| 3,263,902 | 8/1966 | Ludlow et al. | 229/60 |
| 3,321,354 | 5/1967 | McCutcheon Sloan et al. | 493/196 |
| 3,372,625 | 3/1968 | Simecek et al. | 93/35 |
| 3,395,622 | 8/1968 | Kugler | 93/35 |
| 3,403,841 | 10/1968 | Wendt et al. | 229/60 |
| 3,412,925 | 11/1968 | Booth et al. | 229/55 |
| 3,435,736 | 4/1969 | Reiche | 93/35 |
| 3,437,258 | 4/1969 | Kugler | 229/58 |
| 3,509,799 | 5/1970 | Weis et al. | 493/197 |
| 3,548,722 | 12/1970 | Jones et al. | 493/196 |
| 3,548,723 | 12/1970 | Sengewald | 93/35 |
| 3,568,918 | 3/1971 | Bloomqvist | 229/55 |
| 3,575,090 | 4/1971 | Hook | 93/33 |
| 3,585,907 | 6/1971 | Rochla | 493/194 |
| 3,618,478 | 11/1971 | Piazze | 93/35 SB |
| 3,660,959 | 5/1972 | LaFleur | 53/14 |
| 3,669,347 | 6/1972 | Platz et al. | 229/58 |
| 3,684,642 | 8/1972 | Rogers, Jr. | 161/135 |
| 3,736,219 | 5/1973 | McTaggart | 161/147 |
| 3,738,565 | 6/1973 | Ackley et al. | 229/55 |
| 3,739,977 | 6/1973 | Shapiro et al. | 229/55 |
| 3,743,172 | 7/1973 | Ackley et al. | 229/55 R |
| 3,750,937 | 8/1973 | Goodwin | 229/66 |
| 3,774,837 | 11/1973 | Franson | 229/54 R |
| 3,853,664 | 12/1974 | La Fleur | 156/306 |
| 3,865,018 | 2/1975 | Gaffney | 93/8 |
| 3,915,077 | 10/1975 | La Fleur et al. | 93/8 R |
| 3,917,159 | 11/1975 | Platz et al. | 229/58 |
| 3,970,241 | 7/1976 | Hanson | 229/58 |
| 4,041,851 | 8/1977 | Jentsch | 93/35 |
| 4,096,987 | 6/1978 | Rodish | 229/55 |
| 4,135,957 | 1/1979 | Voller | 156/157 |
| 4,216,899 | 8/1980 | Kamp | 229/54 R |
| 4,262,581 | 4/1981 | Ferrell | 493/194 X |
| 4,326,664 | 4/1982 | Benoit et al. | 229/54 R |
| 4,337,058 | 6/1982 | Lerner | 493/11 |

FOREIGN PATENT DOCUMENTS

| Number | Date | Country |
|---|---|---|
| 273685 | 10/1965 | Australia . |
| 920994 | 2/1973 | Canada . |
| 2613724 | 10/1977 | Fed. Rep. of Germany . |
| 2644546 | 6/1978 | Fed. Rep. of Germany . |
| 1185229 | 7/1959 | France . |
| 1376037 | 9/1964 | France . |
| 1496589 | 8/1967 | France . |
| 117620 | 9/1981 | Japan . |
| 7800295 | 4/1979 | Netherlands . |
| 375979 | 4/1964 | Switzerland . |
| 1465695 | 2/1977 | United Kingdom . |
| 1515931 | 6/1978 | United Kingdom . |

Primary Examiner—James F. Coan

[57] ABSTRACT

A flat bottom plastic film bag includes triangular gusset portions formed by a plurality of parallel heat welds which fuse portions of opposed pleats together and cooperate with a transverse central bottom seam to form a flat bottom bag from a seamed or seamless plastic film tube. The longitudinal side and end walls of the bag are provided with heat embossed corrugations which enhance the freestanding characteristics of the bag and a transverse crease is formed along the fold line between the sidewalls of the bag and the bottom wall to enhance the bottom forming characteristics of the bag when it is snapped from a folded position to an opened position. The bag may be made by an improved process wherein a blown film tube is continuously slit sealed into a plurality of tubes which are reinflated, then collapsed to form opposed double pleat folds, followed by corrugation of the side and end walls of the tube, formation of the transverse crease defining the fold line between the bottom and sidewalls and, finally, formation of the gusset welds, the transverse bottom seal and perforation or cutoff to form the individual bags.

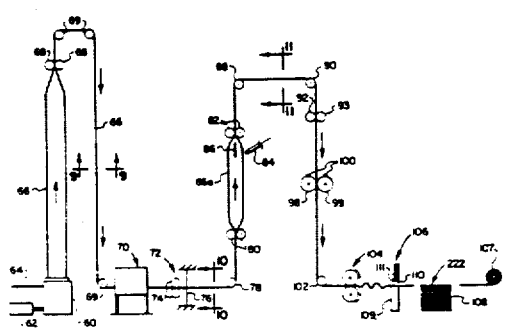

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, line 57 to Column 4, line 14:

Referring now to FIGS. 1 through 3 there is illustrated one embodiment of a plastic bag in accordance with the present invention and generally designated by the numeral 22. The bag 22 is preferably formed of one of the aforementioned plastic materials which may be provided as a continuous blown seamless tube, as a seamed tube provided in accordance with one process of the present invention, or from a seamed tube according to another process. FIG. 1 illustrates the bag 22 in a substantially open position wherein the bottom wall has not been completely formed flat in the interest of illustrating a portion of one of the webs or gussets which forms part of the bottom wall. The bag 22, in the condition shown in FIG. 1, is provided with opposed sidewalls 24 and 26, and end walls 28 and 30. The sidewalls and end walls are delimited by longitudinal generally parallel fold lines 23, 25, 27 and 29, and the bottom of the bag is defined by opposed parallel fold lines 31 which are formed in the respective sidewalls 24 and 26 and opposed fold lines 32, formed in the same plane as the fold lines 31 and across the end walls 28 and 30. The bottom wall of the bag is generally designated by the numeral 34 [and includes a numeral 34] *and includes a* tranverse center seam 36 which is preferably formed by a heat sealing process as will be described in further detail herein.

Column 4, lines 25–46:

Referring now to FIGS. 2, 3 and 4, in particular, the bottom wall 34, which is formed in part by portions of the sidewalls 24 and 26 between the fold lines 31 and the seam 36, is also formed in part by a pair of opposed triangular shaped gussets or webs 41 and 42, which are created by heat sealing portions of the pleats 37 and 39 and 38 and 40 to the respective sidewalls 26 and 24 along diagonal lines extending from the longitudinal corner folds defining the sidewalls to the center seam 36. The gussets 41 and 42 may be formed by heat sealing the respective wall portions described above along respective lines 41a, 41b, 42a and 42b in accordance with an inventive method described in conjunction with FIG. 20. Alternatively, and also in accordance with the present invention, the gussets 41 and 42 may be formed by a plurality *of* parallel heat seals or welds 41c and 42c, respectively, which extend between the respective lines 41a–41b and 42a–42b as illustrated in FIG. 3. The bottom wall 34 is also further strengthened, upon opening the bag, by the formation of second triangular gussets 43 and 45 formed between the folds 32 and the respective aforementioned lines 41a–41b and 42a–42b.

Column 5, lines 13–40:

Additional means for strengthening the sidewalls of the bag 22 to enhance the ability of the bag 22 to assume a freestanding open position is provided by forming the bag from a seamed tube as illustrated in FIG. 6. FIG. 6 is an end view of an alternate embodiment of a bag which has been partially opened to show the bag interior space. Referring to FIG. 6, there is illustrated a seamed plastic tube generally designated by the numeral 46 which may be formed into a bag 122 similar to the bag 22 having opposed sidewalls 124 and 126 and end walls formed by opposed pleats 137, 138, 139 and 140. The plastic film tube 46 has opposed longitudinal seams 50 formed by heat sealing or welding the longitudinal edges of two opposed plastic sheets or panels. Alternatively, and in accordance with the present invention, the tube 46 may be formed by cutting a relatively wide seamless tube into a plurality of opposed longitudinal sheets which are sealed together along the seams 50. Looking at the detail view of FIG. 6A, by way of example, the seam 50 may be formed by opposed heated press rollers and a hot wire knife, for example, to provide a band or web seal 50a of predetermined width and a seal bead or flange 50b to assure that the bag is airtight. Moreover, the formation of the band 50a and the bead 50b provides a relatively [still] *stiff* member which resists bending or deflections perpendicular to its longitudinal axis, and particularly in a plane parallel to the plane of the band 50a.

Column 6, lines 32–47:

The process of the present invention may be adapted to form a series of bags formed end-to-end and connected to each other to be subsequently rolled onto a continuous roll of bags, or the process of the invention may be adapted to form individual bags separated from each other but suitably stacked side-by-side. If a bag 22 is to be formed utilizing the full width of the collapsed tube 66, the arrangement of pinch rollers 68 would include opposed pleat forming guides, not shown, similar to those described in conjunction with FIG. 16, for example, and disposed between the pinch rollers 68 and the die 60 to form the folds 35 so that as the tube passed through the pinch rollers 68 the [basis] *basic* cross-sectional configuration of the tube 66 would become that illustrated in conjunction with the bag 22 as shown in FIG. 5.

Column 7, line 23 to Column 8, line 5:

After passing the station 72 each of the plural tubes 66a, 66b and 66c pass over an idler roller 78, FIG. 8, between pinch rollers 80 and are reinflated by a standing column of air which is trapped between the sets of pinch rollers 80 and a set of pinch rollers 82 disposed spaced from the rollers 80 in the direction of travel of the film tubes. The inflation of tubes 66a, 66b and 66c may be initially created on start up of the process and system illustrated in FIG. [3] *8* utilizing a source of pressure air, not shown, in communication with a nozzle 84 which is inserted through a suitable puncture in each of the tubes to inflate the tubes, as indicated schematically in FIG. 8, whereupon the nozzle is then withdrawn and the tubes resealed prior to start up of the driving of the tubes. Selected ones of the aforementioned sets of rollers as well as additional sets of rollers described in conjunction with the system and process illustrated in FIG. 8 may be power rollers and/or power rollers, not shown, may be added as required for driving the tubes 66, 66a, 66b and 66c through the system.

As the tubes 66a, 66b and 66c approach the pinch rollers 82 they are confronted with opposed pleat forming guides 86, as indicated schematically in FIG. 8 and, by way of example, for the tube 66a in FIG. 16. The tubes 66b and 66c are passed through similar sets of rollers 82 mounted adjacent to the roller set used for tube 66a and disposed downstream of respective sets of pleat forming guides 86. In regard to the further discussion herein in conjunction with FIGS. 8, 12, 13 and 16 through 20 it will be understood that the apparatus described and illustrated is repeated for each of the tubes 66a, 66b and 66c or however many separate tubes are being processed to form finished bags 22, 122 or 222. The guides 86 force the formation of opposed folds such as the folds 135, shown in FIGS. 6 and 7, which cause formation of the opposed pleats 137, 138, 139 and 140. However, due to the formation of the seams 50 the folds 135 are preferably formed to one side of the seams as indicated in FIG. 6 and in this respect the rollers 82 may be oriented slightly skewed with respect to a plane passing through both of the [oppose] *opposed* seams 50 for a tube such as the tube 66a indicated schematically in FIG. 12. Moreover, in order to form the seams 50 oriented as in FIG. 7, the skewing of the rollers 82 with respect to a plane through both seams 50 would be increased, accordingly, as indicated schematically in FIG. 13, for example. The pleat forming guides 86, would, of course, remain in a plane passing between the opposed rollers 82 so that the formation of the opposed pleats would be in the desired plane.

Column 10, lines 29–40:

As the tube 66a passes from the station 104 to the station 106, as indicated schematically in FIG. 8, the transverse seal forming bar 110 operates to form the bottom seal of the bag and the cutoff or perforating blade 111 also operates to [severe] *sever* the tube 66a transversely to form a bag. Since the operation of the seal forming die 110 and the cutoff or perforating blade 111 is intermittent the tube 66a may become slack between the stations 104 and 106 and further power rollers, not shown, may be provided downstream of station 106 in the direction of travel of the bag tubes through the system of FIG. 8.

AS A RESULT OF REEXAMINATION, IT HAS BEEN DETERMINED THAT:

The patentability of claims 1–9 and 11 is confirmed.

Claim 10 is cancelled.

New claims 12–20 are added and determined to be patentable.

*12. An improved high production volume method of forming a plurality of flat bottom bags from a continuously formed tube of plastic film, each of said bags being configured such that, when opened, it has opposed longitudinal side walls and end walls and a generally rectangular integral bottom wall, said method comprising the steps of:*

*forming a continuous plastic film tube;*

*collapsing said tube to a substantially flat band having opposed side walls;*

*passing said tube through means for forming at least one continuous, longitudinally extending band seal thereon which intersecures facing portions of said side walls;*

*slitting said tube along said at least one band seal to form from said tube at least two continuous, laterally smaller tubes each having at least one longitudinally extending seam;*

*passing said laterally smaller tubes through pleat forming guides to form on each laterally smaller tube two laterally opposite pairs of inwardly folded, opposed pleats, each pleat pair being disposed between facing outer side edge portions of a pair of opposed side wall portions of the laterally smaller tube, the opposed pleats in each pair thereof extending laterally inwardly from an opposed pair of longitudinally extending outer side edge folds on the side wall portions and being intersecured along a longitudinally extending central fold line spaced laterally inwardly from the outer side edge fold pair;*

*providing, in conjunction with each pleat pair and the facing side wall outer side edge portions associated therewith, a pair of opposed heating dies and an anvil plate insertable between the opposed pleats in the pair thereof;*

*passing said pleat pairs, and the facing side wall outer side edge portions associated therewith, between their associated heating die pairs while inserting said anvils between their associated pleat pairs, and pressing each pleat and its facing side wall outer side edge portion between their associated heating die and inserted anvil plate to heat seal each side wall outer side edge portion to its facing pleat along a diagonal line extending generally from the center fold line of the pleat to its associated outer side edge fold without appreciably further intersecuring the pleats in each pair thereof;*

*heat sealing said opposed side wall portions of each laterally smaller tube along a transverse line longitudinally disposed at the convergence of the diagonal heat seal lines thereon with the pleat pair centerfold lines thereon to form a center seam on said bottom wall of a bag, and to form opposed triangular gusset portions of said bottom wall; and*

*cutting said laterally smaller tubes adjacent said center seams thereon to define the bottom end of one bag and the top end of another bag formed on each of said laterally smaller tubes.*

*13. The method of claim 12 wherein:*

*said step of passing said tube is performed in a manner causing the formation of at least four spaced apart parallel longitudinal band seals, and*

*said slitting step includes slitting said tube along said at least four spaced apart parallel longitudinal band seals to form three separate, laterally smaller tubes each having opposed longitudinal seams formed by said seal forming means.*

*14. The method set forth in claim 12 further comprising the step of:*

*positioning said longitudinally extending seams to extend along pleats of said laterally smaller tubes.*

*15. The method of claim 12 further comprising the step of:*

*positioning said longitudinally extending seams to extend along side wall portions of said laterally smaller tubes.*

*16. The method of claim 12 further comprising the steps of:*

*providing pressing means engageable with said laterally smaller tubes to form longitudinal corrugations along the sidewall portions thereof, and*

*moving said laterally smaller tubes relative to said pressing means while engaging said laterally smaller tubes with said pressing means to form said corrugations to increase the freestanding capability of said sidewall portions upon opening said bags.*

17. *The method of claim 16 further comprising the step of:*

*pressing each of said laterally smaller tubes to form thereon a transverse crease defining a transverse fold line thereon after forming said corrugations in each of said laterally smaller tubes.*

18. *The method of claim 12 wherein:*

*said heating dies are reciprocated toward and away from said laterally smaller tubes to heat seal said side wall outer side edge portions to their associated pleats along said diagonal lines.*

19. *The method of claim 12 wherein:*

*said heating dies are rotated relative to said laterally smaller tubes to heat seal said side wall outer side edge portions to their associated pleats along said diagonal lines.*

20. *The method of claim 12 further comprising the step of:*

*forming with said heating dies a plurality of heat seal bands on said laterally smaller tubes between their pleats and associated side wall outer side edge portions, said heat seal bands extending generally parallel to said longitudinal seam between said diagonal lines and said center seam of said bottom wall.*

* * * * *